United States Patent
Joret et al.

(10) Patent No.: US 12,037,941 B2
(45) Date of Patent: Jul. 16, 2024

(54) SUPERSONIC SPEED ATTENUATOR OF AN AIR INTAKE OF AN AIRCRAFT PROPULSION ASSEMBLY COMPRISING A DE-ICING DEVICE AND DE-ICING METHOD

(71) Applicant: SAFRAN NACELLES, Gonfreville-L'Orcher (FR)

(72) Inventors: Jean-Philippe Joret, Moissy-Cramayel (FR); Damien Lemoine, Moissy-Cramayel (FR); Charles-Antoine Lampaert, Moissy-Cramayel (FR); Hazem Kioua, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/247,052

(22) PCT Filed: Oct. 1, 2021

(86) PCT No.: PCT/EP2021/077201
§ 371 (c)(1),
(2) Date: Mar. 28, 2023

(87) PCT Pub. No.: WO2022/073892
PCT Pub. Date: Apr. 14, 2022

(65) Prior Publication Data
US 2024/0018903 A1    Jan. 18, 2024

(30) Foreign Application Priority Data
Oct. 8, 2020 (FR) ...................... 2010267

(51) Int. Cl.
*F02C 7/04* (2006.01)
*B64D 33/02* (2006.01)
*F02C 7/047* (2006.01)

(52) U.S. Cl.
CPC .............. *F02C 7/047* (2013.01); *B64D 33/02* (2013.01); *B64D 2033/0233* (2013.01); *B64D 2033/026* (2013.01); *F05D 2220/80* (2013.01)

(58) Field of Classification Search
CPC ......... F01D 25/02; F02C 7/047; B64D 33/02; B64D 15/02; B64D 15/04; B64D 2033/026; F05D 2220/80
(Continued)

(56) References Cited

U.S. PATENT DOCUMENTS

| 2,820,601 A | | 1/1958 | Crawford |
| 3,933,327 A | * | 1/1976 | Cook ..................... B64D 15/04 |
| | | | 244/134 B |

(Continued)

FOREIGN PATENT DOCUMENTS

| CH | 330268 A | 5/1958 |
| RU | 2659426 C1 | 7/2018 |

OTHER PUBLICATIONS

Search Report from the French Intellectual Property Office on corresponding FR application (FR2010267) dated Jun. 15, 2021.
(Continued)

*Primary Examiner* — David E Sosnowski
*Assistant Examiner* — Maxime M Adjagbe
(74) *Attorney, Agent, or Firm* — Alumen IP Law PC

(57) ABSTRACT

Disclosed is a supersonic speed attenuator for an air inlet of an aircraft power plant, having a conical external wall with a tapered end upstream and an internal dividing wall that delimits, with the conical external wall, a cavity; the supersonic speed attenuator further having a de-icing device having: an internal wall mounted in the cavity opposite the conical external wall so that, together, the two walls delimit a calibrated de-icing volume; at least one member for supplying a de-icing air flow, opening into the de-icing
(Continued)

volume; and at least one member for discharging the de-icing air flow from the de-icing space.

18 Claims, 4 Drawing Sheets

(58) Field of Classification Search
USPC .................................................... 244/134 B
See application file for complete search history.

(56) References Cited

U.S. PATENT DOCUMENTS

| | | | |
|---|---|---|---|
| 8,413,930 B2* | 4/2013 | Gregory | B64D 15/04 |
| | | | 244/134 B |
| 10,054,052 B2* | 8/2018 | Zheng | F02C 6/08 |
| 10,533,497 B2* | 1/2020 | Welch | F02C 7/24 |
| 2016/0167792 A1* | 6/2016 | Greenberg | F02C 7/047 |
| | | | 415/116 |
| 2017/0057643 A1* | 3/2017 | Frank | B64D 33/02 |
| 2017/0058772 A1* | 3/2017 | Frank | B64D 33/02 |
| 2017/0166313 A1* | 6/2017 | Saeed | B64D 33/02 |
| 2017/0210475 A1* | 7/2017 | Wiberg | B64D 29/00 |

OTHER PUBLICATIONS

International Search Report and Written Opinion on corresponding PCT application (PCT/EP2021/077201) from International Searching Authority (EPO) dated Jan. 17, 2022.

* cited by examiner

SUPERSONIC SPEED ATTENUATOR OF AN AIR INTAKE OF AN AIRCRAFT PROPULSION ASSEMBLY COMPRISING A DE-ICING DEVICE AND DE-ICING METHOD

TECHNICAL FIELD

The present invention relates to the field of de-icing a supersonic speed attenuator of an air intake of an aircraft propulsion assembly.

In a known manner, with reference to [FIG. 1], a supersonic aircraft propulsion assembly 800 extends longitudinally along an axis X oriented from upstream to downstream and comprises a turbomachine 700 and a nacelle 600 of longitudinal axis X. The turbomachine 700 is configured to enable the propulsion of the aircraft at supersonic speeds from the acceleration of a subsonic air flow F circulating from upstream to downstream in the turbomachine 700. The turbomachine 700 traditionally comprises the following elements, not shown and cited from upstream to downstream: a blower, one (or more) compressor(s), a combustion chamber and one (or more) turbine(s). The nacelle 600 extends for its part externally around the turbomachine 700 and at its upstream end comprises an air intake 500. Hereafter, the terms "upstream" and "downstream" are defined with respect to the orientation of the longitudinal axis X. The terms "inner" and "outer" are for their part defined along the radial direction with respect to the longitudinal axis X.

In a known manner, as shown in [FIG. 1], the air intake 500 comprises a duct 400 of longitudinal axis X configured to guide the air flow F into the turbomachine 700. The air intake 500 also comprises a supersonic speed attenuator 200 extending fixed inside the duct 400 along the longitudinal axis X as well as support arms 300 connecting the supersonic speed attenuator 200 to the duct 400 and extending radially with respect to the longitudinal axis X. The supersonic speed attenuator 200 comprises upstream a conical outer wall 210 with a tapered end 211 extending protruding from the duct 400 in such a way as to generate a shock wave reducing the supersonic speed of the air flow F entering the duct 400 into a subsonic speed.

In practice, ice is likely to form and accumulate on the conical outer wall 210 of the supersonic speed attenuator 200, which disrupts the intake of the air flow F into the duct 400. As shown in [FIG. 1], to avoid this, it is known to add an inner partition 212 in the supersonic speed attenuator 200, so as to delimit with the conical outer wall 210 a cavity 213 in which a de-icing air flow $F_D$ circulates to heat the conical outer wall 210 by thermal exchanges. The de-icing air flow $F_D$ is traditionally taken and discharged into the turbomachine 700, notably into the compressor, via a supply line 101 and a discharge line 102. As shown in [FIG. 1], the supply line 101 and the discharge line 102 emerge at the level of the inner partition 212 passing through the support arms 300 and the duct 400, so as to fluidically connect the turbomachine 700 and the cavity 213.

In fact, such de-icing is ineffective because the cavity 213 comprises a large volume to be heated, with notably an axial length greater than 15 cm. An immediate solution to improve de-icing would be to increase the de-icing air flow $F_D$ delivered, however this would lead to a loss of performance of the turbomachine 700. Another immediate solution would be to deliver a warmer de-icing air flow $F_D$ into the cavity 213. However, this would require heating the de-icing air flow $F_D$ or taking it from a warmer area of the turbomachine 700, resulting in a loss of performance of the turbomachine 700 in both cases.

The invention thus aims to effectively de-ice a supersonic speed attenuator of an air intake of an aircraft propulsion assembly, without reducing the output of the turbomachine.

SUMMARY

The invention relates to a supersonic speed attenuator of an air intake of an aircraft propulsion assembly, said aircraft propulsion assembly extending longitudinally along an axis oriented from upstream to downstream and comprising a turbomachine configured to enable the propulsion of the aircraft at supersonic speeds from the acceleration of a subsonic air flow circulating from upstream to downstream in the turbomachine, said air intake comprising a duct of longitudinal axis configured to guide the air flow in the turbomachine, said supersonic speed attenuator being configured to extend fixed within the duct along the longitudinal axis, said air intake comprising at least one support arm connecting the supersonic speed attenuator to the duct, said supersonic speed attenuator comprising:
  upstream, a conical outer wall with a tapered end, and
  an inner partition delimiting with the conical outer wall a cavity.

The invention is remarkable in that the supersonic speed attenuator comprises a de-icing device comprising:
  an inner wall mounted in the cavity opposite the conical outer wall so as to delimit together a calibrated de-icing volume.
  at least one member for supplying with de-icing air flow emerging into the de-icing volume, and
  at least one member for discharging the de-icing air flow from the de-icing volume.

The de-icing device of the invention advantageously makes it possible to prevent any appearance of ice on the conical outer portion of a supersonic speed attenuator of an aircraft propulsion assembly, without impacting the output of the turbomachine. Indeed, the addition of an inner wall in the cavity makes it possible to restrict the flow of de-icing air near the conical outer wall, i.e. the area to be de-iced, in a calibrated de-icing volume. Heat exchanges thus take place only in the de-icing volume and not in the entire cavity, which improves de-icing efficiency. Further, such a solution does not require changing the de-icing air flow rate or temperature, unlike solutions of the prior art, which avoids any additional energy expense and thus a loss of turbomachine performance.

Preferably, the tapered end of the conical outer wall of the supersonic speed attenuator is configured to generate a shockwave reducing the supersonic speed of the air flow entering the duct to a subsonic speed.

Preferably, the supply member is in the form of a supply line. Also preferably, the discharge member is in the form of a discharge line.

According to one aspect of the invention, the inner wall of the de-icing device comprises at least one frustoconical portion of longitudinal axis with an increasing cross-section from upstream to downstream, preferably a single frustoconical portion extending over at least 50% of the longitudinal length of the inner wall. Preferentially, the frustoconical portion extends over at least 75% of the longitudinal length of the inner wall. In other words, the de-icing volume comprises a substantially conical shape. Advantageously, the inner wall comprises a shape similar to the conical outer wall thanks to its frustoconical portion, which makes it possible to generate a reduced de-icing volume and to concentrate heat exchanges at the level of the conical outer wall.

According to one aspect of the invention, the frustoconical portion of the inner wall comprises an opening angle greater than or equal to the opening angle of the conical outer wall, preferably strictly greater than the opening angle of the conical outer wall. In other words, the de-icing volume comprises a radial thickness, defined as the radial space separating the inner wall from the conical outer wall, which is non-constant but decreases from upstream to downstream as the conical outer wall widens. Such a reduction from upstream to downstream in the thickness of the de-icing volume, combined with an increase in the cross-sectional area of the conical outer wall, makes it possible to limit the increase in the cross-sectional area of the de-icing volume. This makes it possible to ensure a sufficient speed of the de-icing air flow in the de-icing volume and thus the efficiency of heat exchanges.

According to one aspect of the invention, the de-icing volume comprises a substantially constant cross-sectional area over at least 50% of its length, preferably over at least 75% of its length. It is specified that the term "substantially" here means that a slight variation of less than 20% of the cross-sectional area is allowed. Such a constant cross-sectional area advantageously makes it possible to maintain the speed of the de-icing air flow and thus to ensure good heat exchanges. Preferably, such a constant cross-sectional area is equal to the cross-sectional area of the supply line and/or the discharge line. The de-icing air flow in this way retains its speed once it has been routed through the de-icing volume, unlike the prior art where its speed was much slower in the cavity.

According to one aspect of the invention, the de-icing volume comprises a radial thickness of less than 50 mm, preferentially less than 30 mm, and preferably more than 2 mm. A small radial thickness makes it possible to concentrate the de-icing air flow at the level of the conical outer wall.

According to one aspect of the invention, the inner wall of the de-icing device comprises at its upstream end an opening for fluidic communication of the supply member and the de-icing volume. Since the de-icing air flow cools as it heats the conical outer wall, which reduces heat exchanges, an upstream supply to the area most exposed to icing cleverly enables efficient de-icing.

Preferably, the supply line extends internally to the inner wall, preferentially along the longitudinal axis X, so as to allow the de-icing air flow to be routed upstream.

According to one aspect of the invention, the inner partition comprises at least one opening for fluidic communication of the discharge member and the de-icing volume. This de-icing air flow thus circulates from upstream to downstream through the entire de-icing volume for complete and efficient de-icing.

Preferably, the de-icing volume extends longitudinally from the tapered end to the inner partition, so as to de-ice the conical outer wall in an overall manner.

According to one aspect of the invention, the cavity comprises an axial length greater than 15 cm. The de-icing device is particularly suitable for long cavity supersonic speed attenuators where the generated de-icing volume makes it possible to greatly limit the volume in which the de-icing air flow circulates, thus concentrating heat exchanges.

The invention also relates to an air intake of an aircraft propulsion assembly, said aircraft propulsion assembly extending longitudinally along an axis oriented from upstream to downstream and comprising a turbomachine configured to enable the propulsion of the aircraft at supersonic speeds from the acceleration of a subsonic air flow circulating from upstream to downstream in the turbomachine, said air intake comprising:
- a duct of longitudinal axis configured to guide the air flow into the turbomachine,
- a supersonic speed attenuator as previously described, extending fixed inside the duct along the longitudinal axis, and
- at least one support arm connecting the supersonic speed attenuator to the duct.

The invention further relates to an aircraft propulsion assembly extending longitudinally along an axis oriented from upstream to downstream and comprising a turbomachine configured to enable the propulsion of the aircraft at supersonic speeds from the acceleration of a subsonic air flow circulating from upstream to downstream in the turbomachine, said aircraft propulsion assembly comprising an air intake as described previously.

The invention also relates to a method for de-icing a supersonic speed attenuator as described previously, said method comprising:
- a step of supplying the de-icing volume with de-icing air flow from the supply member,
- a step of circulating the de-icing air flow through the de-icing volume, in order to heat the outer wall by heat exchanges, in order to de-ice it, and
- a step to discharging the de-icing air flow in the discharge member out of the de-icing volume.

Advantageously, the circulation step is implemented in the de-icing volume and not in the entire cavity, which makes it possible to increase the speed of the de-icing air flow and concentrate heat exchanges at the level of the conical outer wall to be de-iced, for greater efficiency. Such a method is advantageously simple, fast and does not require any additional energy expense.

BRIEF DESCRIPTION OF THE DRAWINGS

The invention will be better understood upon reading the following description, given as an example, and by referring to the following figures, given as non-limiting examples, in which identical references are given to similar objects.

It should be noted that the figures set out the invention in detail in order to implement the invention, said figures can of course be used to better define the invention if necessary.

DETAILED DESCRIPTION

Figure 1:
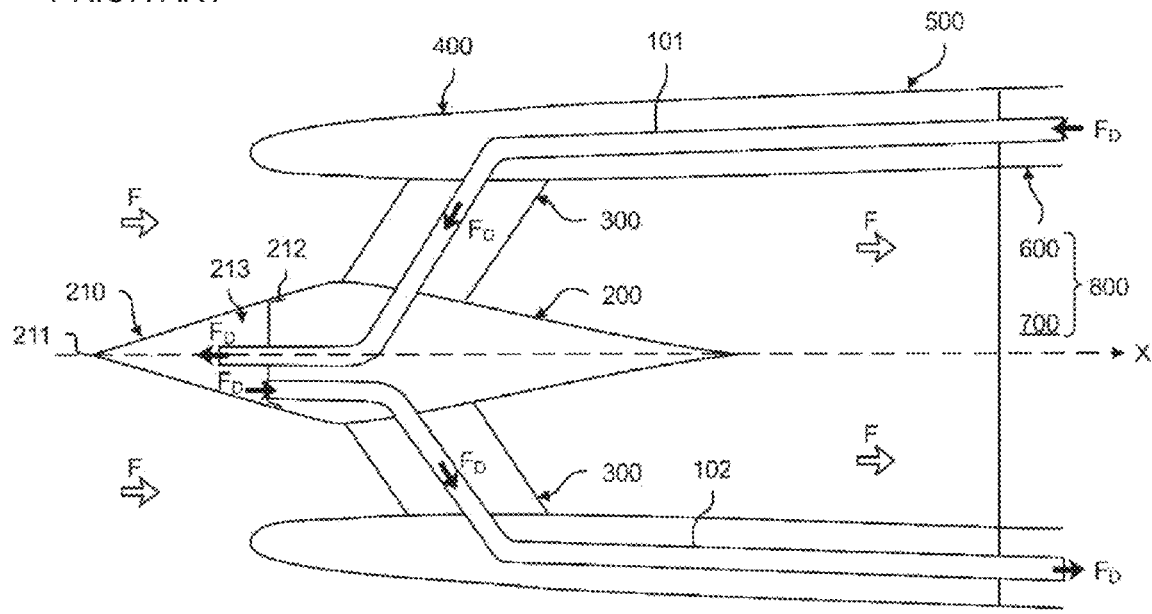
FIG. 1 is a longitudinal sectional representation of an air intake of an aircraft propulsion assembly comprising a supersonic speed attenuator according to the prior art.
Figure 2:
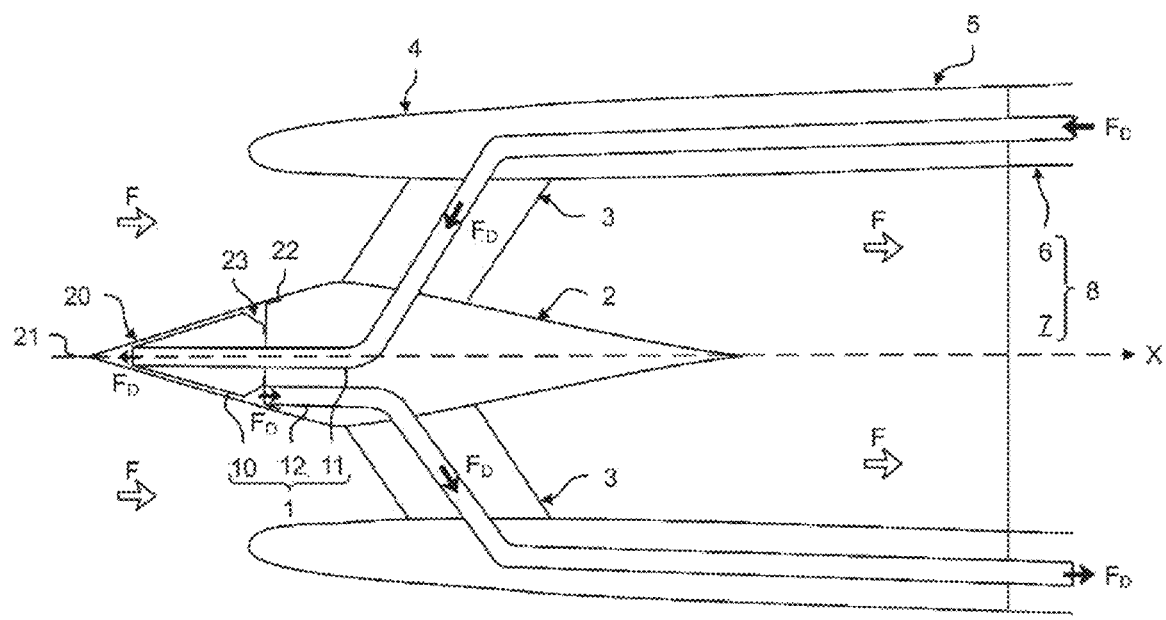
FIG. 2 is a longitudinal sectional representation of an air intake of an aircraft propulsion assembly comprising a supersonic speed attenuator according to one embodiment of the invention.

Referring to [FIG. 2] and as described in the preamble, an aircraft propulsion assembly 8 extends longitudinally along an axis X oriented from upstream to downstream and comprises a turbomachine 7 and a nacelle 6 of longitudinal axis X. The turbomachine 7 is configured to enable the propulsion of the aircraft at supersonic speeds from the acceleration of a subsonic air flow F circulating from upstream to downstream in the turbomachine 7. The turbomachine 7 traditionally comprises the following elements, not shown and cited from upstream to downstream: a blower, one (or more) compressor(s), a combustion chamber and one (or more) turbine(s). The nacelle 6 extends for its part externally around the turbomachine 7 and comprises an air intake 5 at its upstream end. Hereafter, the terms "upstream" and "downstream" are defined with respect to the orientation of the longitudinal axis X. The terms "inner" and "outer" are for their part defined along the radial direction with respect to the longitudinal axis X.

As shown in [FIG. 2] and described in the preamble, the air intake 5 comprises a duct 4 of longitudinal axis X configured to guide the air flow F into the turbomachine 7. In a known manner, the duct 4 is substantially cylindrical and comprises an inner wall to guide the air flow F to the turbomachine 7.

The air intake 5 also comprises a supersonic speed attenuator 2 extending fixed inside the duct 4 along the longitudinal axis X as well as support arms 3 connecting the supersonic speed attenuator 2 to the duct 4 and extending radially with respect to the longitudinal axis X.

With reference to [FIG. 2] and as described in the preamble, the supersonic speed attenuator 2 comprises an upstream portion which comprises a conical outer wall 20 as well as an inner partition 22 delimiting together a cavity 23. The conical outer wall 20 comprises an upstream tapered end 21 in such a way as to generate a shock wave reducing the supersonic speed of the air flow F entering the duct 4 to a subsonic speed. It should be noted that, in this example, the tapered end 21 extends protruding upstream in relation to the duct 4 to promote the generation of the shock wave, but that it could alternatively be aligned with the upstream end of the air intake 4 or be situated further downstream. In practice, ice is likely to form and accumulate on the conical outer wall 20 of the supersonic speed attenuator 2, which disrupts the intake of the air flow F in the duct 4. In this example, the supersonic speed attenuator 2 comprises a downstream portion which comprises a conical outer wall that is tapered downstream. In other words, the supersonic speed attenuator 2 comprises an upstream portion of increasing cross-section from upstream to downstream and then a downstream portion of decreasing cross-section from upstream to downstream as shown in [FIG. 2].

Figure 3:
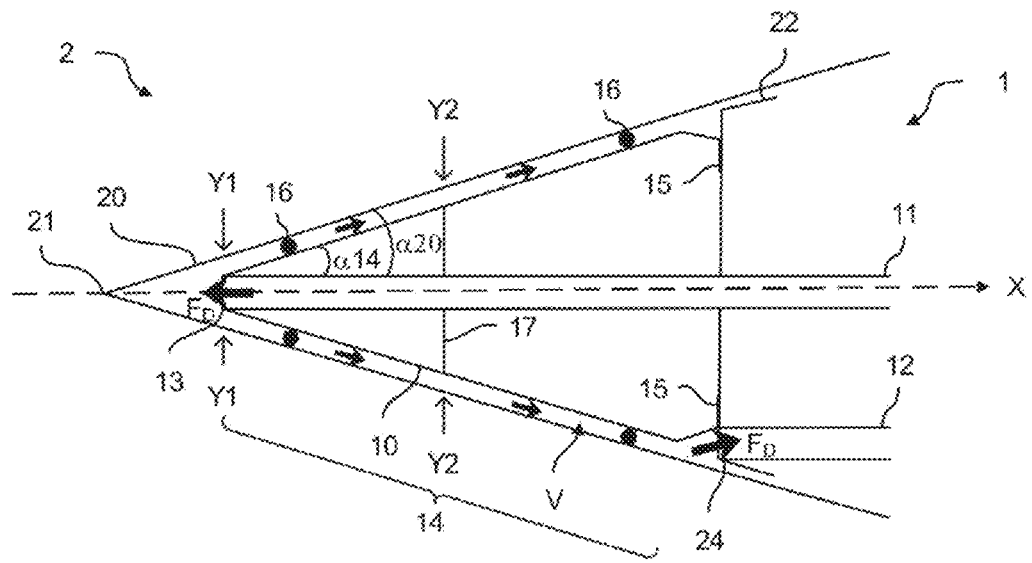
FIG. 3 is a longitudinal sectional representation of the upstream portion of the supersonic speed attenuator of [FIG. 2]

According to the invention and still with reference to FIGS. 2 and 3, to eliminate ice and prevent its appearance, the supersonic speed attenuator 2 further comprises a de-icing device 1 comprising:
an inner wall 10 mounted in the cavity 23 opposite the conical outer wall 20 so as to delimit together a calibrated de-icing volume V ([FIG. 3]),
one (or more) de-icing air flow $F_D$ supply line(s) 11 emerging into the de-icing volume V, and
one (or more) line(s) 12 for discharging the de-icing air flow $F_D$ from the de-icing volume V.

In the example of FIGS. 2 and 3, a single supply line 11 and a single discharge line 12 are shown. The supply line 11 is configured to take the de-icing air flow $F_D$ from the air flow F at the level of the compressor of the aircraft turbomachine 7. As shown in [FIG. 2], the supply line 11 extends inside the duct 4 and a support arm 3 in order to rejoin the supersonic speed attenuator 2. As shown in [FIG. 3], within the supersonic speed attenuator 2, the supply line 11 passes through the inner partition 22 and extends internally to the inner wall 10, so as to emerge into the de-icing volume V at the level of an opening 13 of the inner wall 10 situated upstream.

As shown in [FIG. 3], the discharge line 12 is configured to take the de-icing air flow $F_D$ from the de-icing volume V in an opening 24 formed downstream in the inner partition 22. As shown in [FIG. 2], the discharge line 12 extends inside a support arm 3 and the duct 4 so that it emerges into the air flow F at the level of the aircraft turbomachine compressor. Preferably, the supply line 11 and the discharge line 12 extend into different support arms 3. The air intake 5 typically comprising at least three support arms 3, the discharge line 12 extends into one of the support arms 3 and one or two supply lines 11 each extends into another support arm 3. Still preferably, the supply lines 11 from the two support arms 3 merge downstream of the inner partition 22 to form a single supply line 11.

It goes without saying that the supply and discharge of the de-icing air flow $F_D$ could be implemented differently and with any supply member 11 and discharge member 12. As an example, the discharge member 12 could be in the form of an opening formed in the conical outer wall 20.

With reference to [FIG. 3], the inner wall 10 of the de-icing device 1 comprises from upstream to downstream an opening 13 for fluidic communication of the supply line 11 and the de-icing volume V, a frustoconical wall 14 and a fastening portion 15 on the inner wall 22, in order to maintain the inner wall 10. Preferably, the fastening portion 15 and the inner partition 22 are welded or assembled by fastening elements, such as screws. In the example of [FIG. 3], the inner wall 10 further comprises support elements 16 housed in the de-icing volume V in contact with the conical outer wall 20 and the inner wall 10, so as to maintain the inner wall 10 in position in addition to the fastening portion 15. Also in the example of [FIG. 3], the inner wall 10 further comprises a maintaining frame 17 connecting the supply line 11 to the inner wall 10 and extending transversely with respect to the longitudinal axis X, so as to maintain the supply line 11 fixed. It goes without saying that the inner wall 10 could comprise any number of supporting elements 16 and maintaining frames 17. The inner wall 10 could also be exempt of support elements 16 and/or maintaining frame 17. Preferably, the inner wall 10 comprises titanium.

In the example of [FIG. 3], the frustoconical portion 14 comprises an increasing circular cross-section from upstream to downstream, as well as the conical outer wall 20. The frustoconical wall 14 further extends over more than 75% of the longitudinal length of the inner wall 10 so that the de-icing volume V formed has a substantially conical shape.

Such a shape allows the de-icing volume V to comprise restricted dimensions while extending longitudinally from the tapered end 21 to the inner partition 22. As a result, the conical outer wall 20 is heated efficiently and globally by concentrating heat exchanges in the de-icing volume V rather than in the entire cavity 23. It goes without saying that the frustoconical portion 14 could be reduced and/or that the inner wall 10 could comprise several successive frustoconical portions 14, however the efficiency of heat exchanges would be reduced. Preferably, the inner wall comprises a single frustoconical portion 14 extending over at least 50% of the longitudinal length of the inner wall 10.

Figure 4:
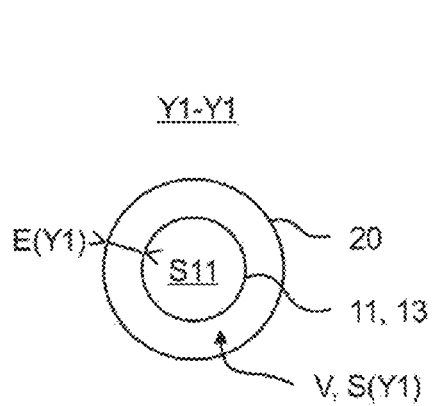
FIG. 4 and
FIG. 5 are representations along two transverse sections of the upstream part of the supersonic speed attenuator of [FIG. 3]
Figure 5:
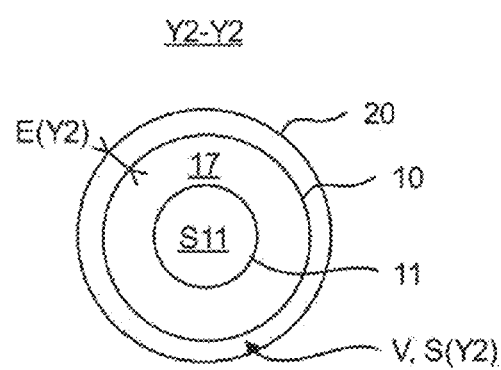

Also in the example of [FIG. 3], the frustoconical portion 14 comprises an opening angle α14, defined with respect to the longitudinal axis X, which is greater than the opening angle α20 of the conical outer wall 20. In other words, the frustoconical portion 14 comprises a cross-sectional area that widens more from upstream to downstream than the cross-sectional area of the conical outer wall 20. As a result, the radial thickness of the de-icing volume V, defined as the distance separating the conical outer wall 20 from the inner wall 10 in a radial plane to the longitudinal axis X, decreases from upstream to downstream along the frustoconical portion 14. As shown in FIGS. 3, 4 and 5, considering an upstream transverse plane Y1-Y1 and a downstream transverse plane Y2-Y2, the radial thickness E(Y1) ([FIG. 4]) of the de-icing volume V in the upstream transverse plane Y1-Y1 is greater than its radial thickness E(Y2) ([FIG. 5]) in the downstream transverse plane Y2-Y2.

Preferably, the opening angle α14 of the frustoconical portion 14 is chosen so that the transverse surface of the de-icing volume V, i.e. its area in a transverse plane Y1-Y1, Y2-Y2, is substantially constant along the frustoconical portion 14. It is specified that the term "substantially" here means that a slight variation of less than 20% of the cross-sectional area is allowed. Thus, as shown in FIGS. 4 and 5, the transverse surface S(Y1) of the de-icing volume V in the upstream transverse plane Y1-Y1 is equal to its transverse surface S(Y2) in the downstream transverse plane Y2-Y2. Maintaining the transverse surface of the de-icing volume V advantageously makes it possible to maintain the speed of the de-icing air flow $F_D$ and thus improve heat exchanges with the conical outer wall 20.

As shown in FIGS. 4 and 5, preferably also the opening angle α14 of the frustoconical portion 14 is chosen so that the cross-sectional area S of the de-icing volume V is substantially equal to the cross-sectional area S11 of the supply line 11. The de-icing air flow $F_D$ thus maintains its routing speed within the de-icing volume V, which promotes heat exchanges and its correct circulation in the de-icing volume V. Preferably also, the cross-sectional area of the discharge line 12 is equal to the cross-sectional area S11 of the supply line 11 in such a way as to promote the circulation of the de-icing air flow $F_D$ from upstream to downstream in the de-icing volume V. According to a preferred aspect, the radial thickness E of the de-icing volume V is less than 50 mm, preferably less than 30 mm, and greater than 2 mm.

Figure 6:
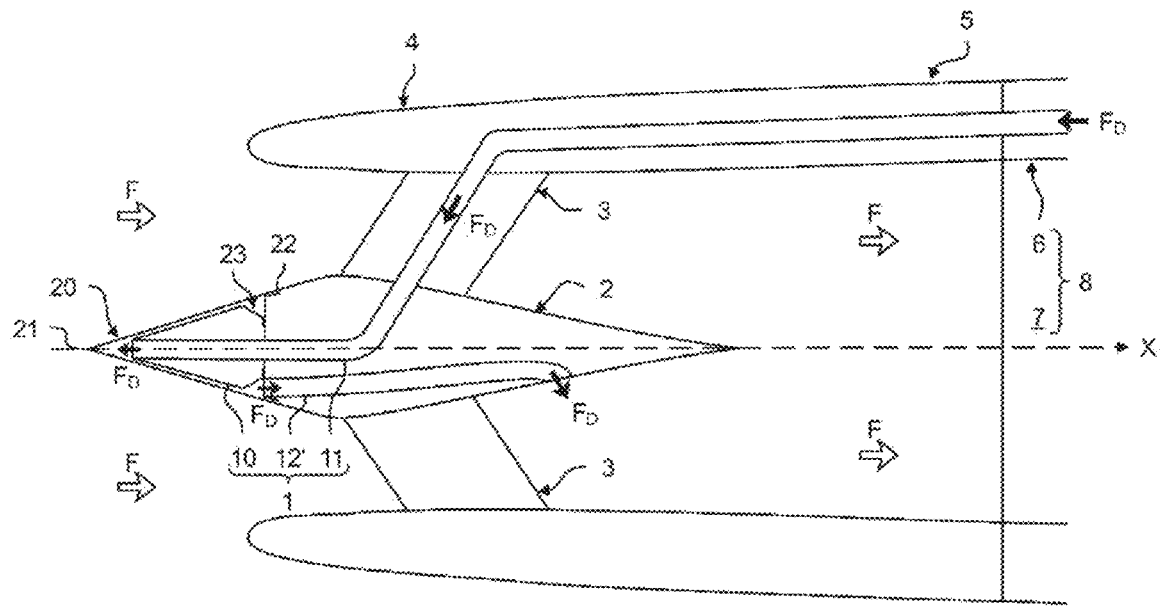
FIG. 6 and
FIG. 7 are longitudinal cross-sectional representations of an air intake of an aircraft propulsion assembly comprising a supersonic speed attenuator according to two alternative embodiments of the invention.
Figure 7:
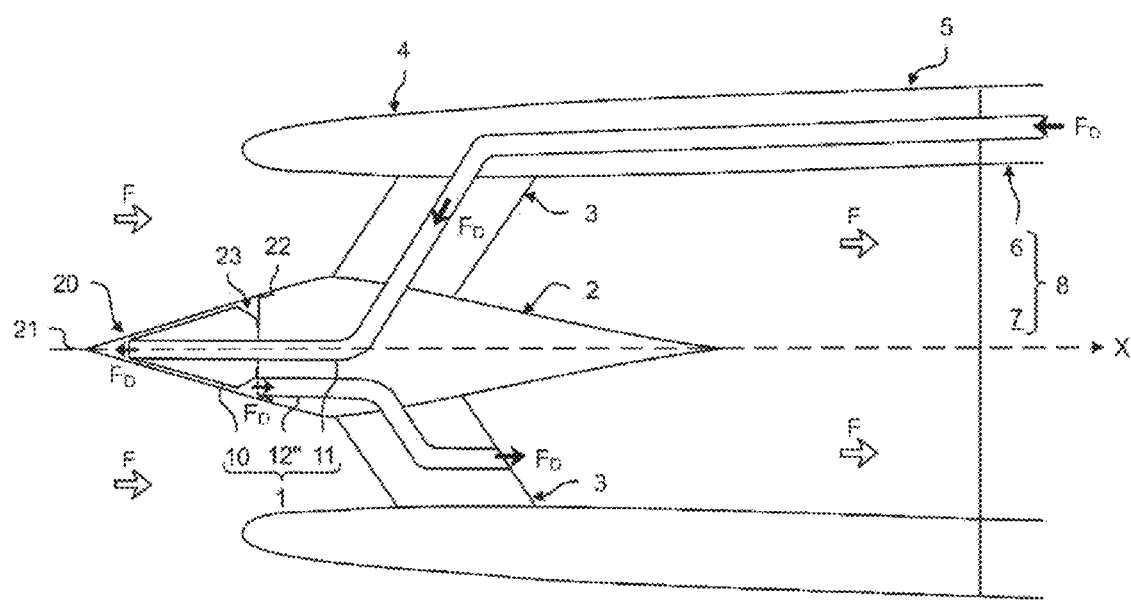

Referring to FIGS. 6 and 7 illustrating alternatives of the invention, the discharge line 12 may emerge elsewhere than at the level of the compressor of the turbomachine 7. In the example of [FIG. 6], the discharge line 12 extends only into the supersonic speed attenuator 2 and emerges downstream. In the example of [FIG. 7], the discharge line 12 extends only into the supersonic speed attenuator 2 and a support arm 3 and emerges downstream of said support arm 3. In these two examples, the de-icing air flow $F_D$ is thus discharged into the outer air flow F at the level of the air intake 5 before it enters the aircraft turbomachine 7. It goes without saying that the discharge line 12 could emerge elsewhere without this modifying the invention. Similarly, it goes without saying that the supply line 11 could take the de-icing air flow $F_D$ elsewhere than at the compressor of the turbomachine 7 without this modifying the invention.

Figure 8:
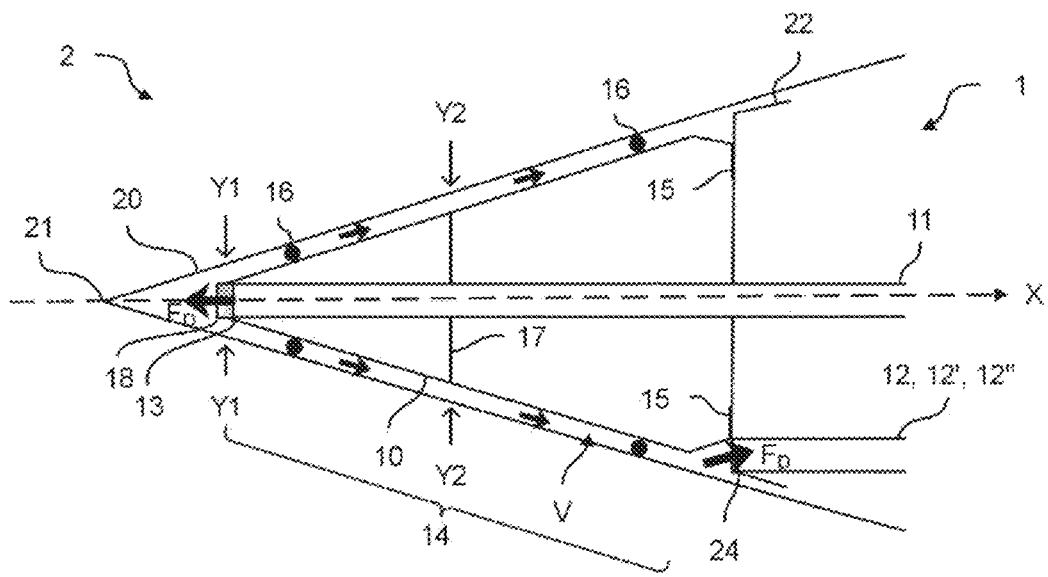
FIG. 8 and
FIG. 9 are two longitudinal cross-sectional representations of the upstream portion of the supersonic speed attenuator according to two alternative embodiments of the invention.

In the example of [FIG. 8] illustrating another alternative of the invention, the opening 13 of the inner wall 10 comprises a grid 18 in order to accelerate the de-icing air flow $F_D$ passing through it. A grid 18 may also be provided for the opening 24 of the inner partition 22 to accelerate the de-icing air flow $F_D$ downstream of the de-icing volume V before its discharge. The increase of the speed of the de-icing air flow $F_D$ promotes heat exchanges.

The invention provides alternatively for adding a diffusion member at the level of the opening 13 of the inner wall 10 so as to diffuse the de-icing air flow $F_D$ as close as possible to the conical outer wall 20. For example, the diffusion member is in the form of a manifold comprising perforations or tubes guiding the de-icing air flow $F_D$ against the conical outer wall 20.

Figure 9:
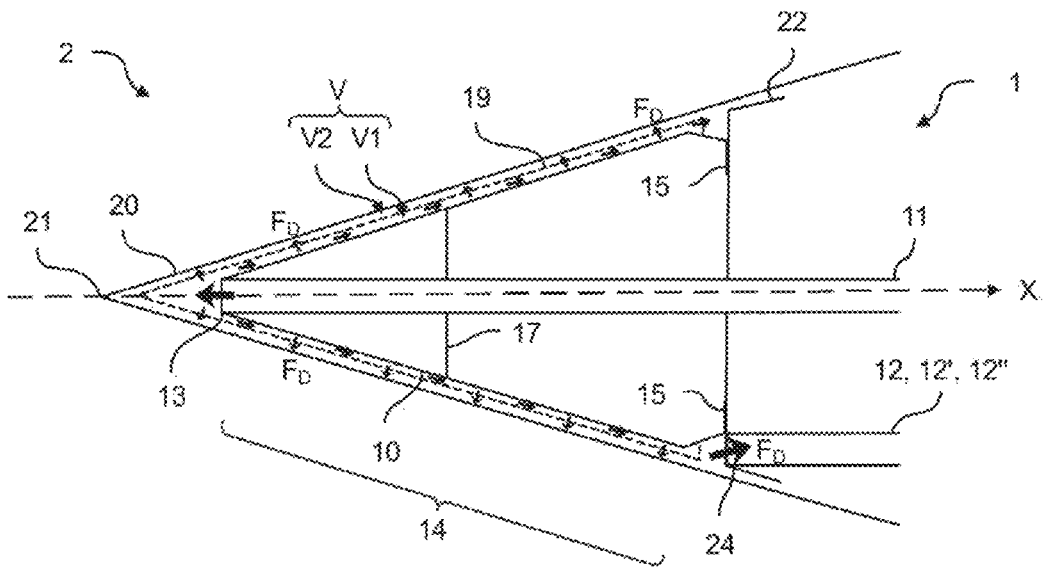

In the example of [FIG. 9] illustrating another alternative of the invention, the de-icing device 1 comprises a perforated wall 19 mounted in the de-icing volume V between the inner wall 10 and the conical outer wall 20 in such a way as to guide the de-icing air flow $F_D$ against the conical outer wall 20 and favor heat exchanges there. More precisely, the perforated wall 19 delimits a first sub-volume V1, on the side of the inner wall 10 and into which the supply line 11 emerges, and a second sub-volume V2, on the side of the conical outer wall 20. The first sub-volume V1 and the second sub-volume V2 together form the de-icing volume V. The first sub-volume V1 and the second sub-volume V2 are fluidically connected via perforations in the perforated wall 19 which make it possible to accelerate the de-icing air flow $F_D$ when it is admitted into the second sub-volume V2. Preferably, the perforated wall 19 extends over at least 50% of the longitudinal length of the inner wall 10, preferentially over at least 75% of the longitudinal length of the inner wall 10. Also preferably, the perforated wall 19 comprises a conical shape.

The invention also relates to a method for de-icing the supersonic speed attenuator 2 by means of the de-icing device previously presented. With reference to [FIG. 10], the de-icing method first comprises a step of supplying E1 the de-icing volume V with de-icing air flow $F_D$, followed by a circulation step E2 in the de-icing volume V and finally a step E3 of discharging the de-icing air flow $F_D$ out of the de-icing volume V.

Figure 10:
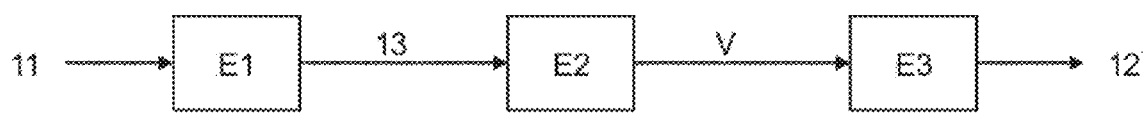
FIG. 10 is a schematic representation of the steps of the method for de-icing a supersonic speed attenuator according to one embodiment of the invention.

As illustrated in FIGS. 2 and 10, more precisely, during the supply step E1, the de-icing air flow $F_D$ is routed via the supply air line 11 from its withdrawal point, in the air flow F at the level of the compressor of the turbomachine 7 or other, up to the de-icing volume V. To do this, the de-icing air flow $F_D$ passes through the duct 4, a support arm 3 and the inner partition 22 up to the opening 13 formed in the inner wall 10 upstream.

As illustrated in FIGS. 3 and 10, in the circulation step E2, the de-icing air flow $F_D$ circulates from upstream to downstream in the de-icing volume V in contact with the conical outer wall 20 in order to heat it by heat exchanges, convective but also conductive, in order to de-ice it. The most important heat exchanges take place upstream when the temperature of the de-icing air flow $F_D$ is the highest, which corresponds to the area most subject to icing. The speed of the de-icing air flow $F_D$ is kept substantially constant to promote heat exchanges throughout the de-icing volume V.

Still referring to FIGS. 3 and 10, during the discharge step E3, the de-icing air flow $F_D$, the temperature of which has decreased to warm the conical outer wall 20, rejoins the discharge line 12 to be expelled into the air flow F at the level of the compressor ([FIG. 2]) or into the air intake 5 (FIGS. 6 and 7).

To sum up, the invention makes it possible to de-ice and prevent the appearance of ice on the upstream conical outer wall 20 of a supersonic speed attenuator 2 of an aircraft propulsion assembly 8. The de-icing is advantageously effective and energy-efficient because it is targeted in contact with the conical outer wall 20 and not throughout the cavity 23 as in the prior art. To do this, an inner wall 10 is added to the cavity 23 in order to delimit a restricted de-icing volume V, where the speed of the de-icing air flow $F_D$ is maintained substantially constant for efficient heat exchanges. Such de-icing is particularly advantageous when the upstream portion of the supersonic speed attenuator 2 is long.

The invention claimed is:

1. A supersonic speed attenuator of an air intake of an aircraft propulsion assembly, said aircraft propulsion assembly extending along a longitudinal axis and oriented from upstream to downstream and comprising a turbomachine configured to enable propulsion of an aircraft at supersonic speeds from an acceleration of a subsonic air flow circulating from upstream to downstream in the turbomachine, said air intake comprising a duct arranged along the longitudinal axis and configured to guide the subsonic air flow into the turbomachine, said supersonic speed attenuator being configured to extend fixed inside the duct along the longitudinal axis in a fixed manner, said air intake comprising at least one support arm connecting the supersonic speed attenuator to the duct, said supersonic speed attenuator comprising:
   a conical outer wall with a tapered end located upstream of a downstream structure,
   an inner partition delimiting a cavity with the conical outer wall,
   a de-icing device comprising:
      an inner wall mounted in the cavity adjacent to the conical outer wall so as to delimit a calibrated de-icing volume within the cavity,
      at least one member for supplying de-icing air flow emerging into the calibrated de-icing volume, and
      at least one member for discharging the de-icing air flow from the calibrated de-icing volume.

2. The supersonic speed attenuator according to claim 1, wherein the inner wall of the de-icing device comprises at least one frustoconical portion and an increasing cross-section from upstream to downstream along the longitudinal axis.

3. The supersonic speed attenuator according to claim 2, wherein the frustoconical portion of the inner wall comprises an opening angle that is greater than or equal to an opening angle of the conical outer wall.

4. The supersonic speed attenuator according to claim 1, wherein the calibrated de-icing volume comprises a cross-sectional area that is substantially constant over at least 50% of its length.

5. The supersonic speed attenuator according to claim 1, wherein the calibrated de-icing volume comprises a radial measurement of less than 50 mm.

6. The supersonic speed attenuator according to claim 1, wherein the inner wall of the de-icing device comprises, at its upstream end, an opening for fluidic communication between the at least one member for supplying and the calibrated de-icing volume.

7. The supersonic speed attenuator according to claim 1, wherein the inner partition comprises at least one opening for fluidic communication of the at least one member for discharging and the calibrated de-icing volume.

8. The supersonic speed attenuator according to claim 1, wherein the cavity comprises an axial length greater than 15 cm.

9. An air intake of an aircraft propulsion assembly, said aircraft propulsion assembly extending along a longitudinal axis oriented from upstream to downstream and comprising a turbomachine configured to enable propulsion of an aircraft at supersonic speeds from acceleration of a subsonic air flow circulating from upstream to downstream in the turbomachine, said air intake comprising:
   a duct arranged lengthwise along the longitudinal axis and configured to guide the subsonic air flow into the turbomachine,
   the supersonic speed attenuator according to claim 1, extending inside the duct along the longitudinal axis in a fixed manner, and
   at least one support arm connecting the supersonic speed attenuator to the duct.

10. A method for de-icing the supersonic speed attenuator according to claim 1, said method comprising:
   a step of supplying the calibrated de-icing volume with de-icing air flow via the supply member,
   a step of circulating the de-icing air flow in the calibrated de-icing volume to heat the conical outer wall by thermal exchanges, and
   a step of discharging the de-icing air flow in the at least one member for discharging out of the calibrated de-icing volume.

11. A supersonic speed attenuator of an air intake of an aircraft propulsion assembly, said aircraft propulsion assembly extending along a longitudinal axis and oriented from upstream to downstream and comprising a turbomachine configured to enable propulsion of an aircraft at supersonic speeds from an acceleration of a subsonic air flow circulating from upstream to downstream in the turbomachine, said air intake comprising a duct arranged along the longitudinal axis and configured to guide the subsonic air flow into the turbomachine, said supersonic speed attenuator being configured to extend inside the duct along the longitudinal axis, said air intake comprising a support arm connecting the supersonic speed attenuator to the duct in a fixed manner, said supersonic speed attenuator comprising:
   an outer wall having a conical shape with a tapered end, said outer wall with the conical shape located upstream of a downstream conical structure,
   an inner partition connected to the outer wall having the conical shape to define a cavity having a first volume,
   a de-icing device comprising (1) a wall structure mounted in the cavity of the outer wall with the conical shape to define a calibrated de-icing volume having a second volume within the cavity, (2) a supply line for supplying de-icing air flow emerging into the calibrated de-icing volume, and (3) a discharge line for discharging the de-icing air flow from the calibrated de-icing volume.

12. The supersonic speed attenuator according to claim 11, wherein the wall structure of the de-icing device comprises a conical shape wall structure.

13. The supersonic spped attenuator according to claim 11, wherein the wall structure of the de-icing device has a radial inward taper where it connects to the inner partition.

14. The supersonic speed attenuator according to claim 11, wherein the outer wall having the conical shape has a first length and the downstream conical structure has a second length, and wherein the first length and the second length are unequal.

15. The supersonic speed attenuator according to claim 11, wherein the outer wall having the conical shape has a first length and the downstream conical structure has a second length, and wherein the length is larger than the first length.

16. The supresonic speed attenuator according to claim 11, wherein the supply line passes through the cavity and has a discharge opening adjacent the tapered end of the outer wall with conical shape.

17. The supersonic speed attenuator according to claim 16, wherein the calibrated de-icing volume comprises a space between the outer wall having the conical shape and the wall structure of the de-icing device.

18. The supersonic speed attenuator according to claim 17, wherein the calibrated de-icing volume is connected to the discharge line at a location away from the tapered end.

* * * * *